US008723040B2

(12) United States Patent
Sakura

(10) Patent No.: US 8,723,040 B2
(45) Date of Patent: May 13, 2014

(54) TERMINAL STRUCTURE FOR WIRE HARNESS

(75) Inventor: Kazunari Sakura, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/582,844

(22) PCT Filed: Apr. 6, 2011

(86) PCT No.: PCT/JP2011/058691

§ 371 (c)(1), (2), (4) Date: Sep. 5, 2012

(87) PCT Pub. No.: WO2011/126042

PCT Pub. Date: Oct. 13, 2011

(65) Prior Publication Data

US 2012/0325552 A1 Dec. 27, 2012

(30) Foreign Application Priority Data

Apr. 8, 2010 (JP) ................................ 2010-089197

(51) Int. Cl.

| | |
|---|---|
| ***H02G 15/02*** | (2006.01) |
| ***H01R 4/70*** | (2006.01) |
| ***H01R 13/52*** | (2006.01) |
| ***H01R 43/24*** | (2006.01) |
| *H01R 13/03* | (2006.01) |
| *H01B 7/00* | (2006.01) |

(52) U.S. Cl.

CPC .................. *H01R 4/70* (2013.01); *H01R 13/52* (2013.01); *H01R 43/24* (2013.01); *H01R 13/03* (2013.01); *H01B 7/00* (2013.01)

USPC ..... 174/74 R; 174/68.1; 174/72 A; 174/72 R; 439/203

(58) Field of Classification Search

CPC ............ H01R 4/20; H01R 4/70; H01R 13/00; H01R 13/02; H01R 13/03; H01R 13/5216; H01R 13/5221; H01R 13/52; H01R 4/185; H01R 43/24; H01B 7/00; H01B 7/28; H01B 7/282; H01B 7/825

USPC ........ 174/74 R, 68.1, 68.3, 72 A, 72 R, 84 C; 439/203, 865, 866, 868

See application file for complete search history.

(56) References Cited

U.S. PATENT DOCUMENTS 3,955,044 A * 5/1976 Hoffman et al. ............ 174/84 C
5,519,170 A * 5/1996 Nabeshima ................ 174/74 R (Continued)

FOREIGN PATENT DOCUMENTS

JP A-2002-315130 10/2002
JP A-2003-297477 10/2003
JP B2-03627846 3/2005
JP A-2008-77840 4/2008

OTHER PUBLICATIONS

May 17, 2011 International Search Report issued in International Patent Application No. PCT/JP2011/058691.

(Continued)

*Primary Examiner* — Angel R Estrada

(74) *Attorney, Agent, or Firm* — Oliff PLC

(57) ABSTRACT

According to the present invention, in a terminal region of a coated wire, a swaged part formed at one end of a terminal fitting is swaged along an outer circumference of a coating part of the coated wire, and the terminal fitting is fixed to a terminal section of the coated wire. A molding resin is formed so as to completely coat the entire outer circumference of an exposed end region (a region including a fracture surface and a base edge) of the swaged part and its adjacent region.

3 Claims, 6 Drawing Sheets

(56) References Cited

U.S. PATENT DOCUMENTS

| | | | | |
|---|---|---|---|---|
| 5,532,433 | A * | 7/1996 | Endo et al. .................. | 174/84 C |
| 6,303,865 | B1 * | 10/2001 | Yamamoto et al. ......... | 174/72 A |
| 7,238,884 | B2 * | 7/2007 | Tanaka et al. ............... | 174/74 R |
| 2001/0003591 | A1 | 6/2001 | Kondo | |

OTHER PUBLICATIONS

Oct. 9, 2012 International Preliminary Report on Patentability issued in International Patent Application No. PCT/JP2011/058691 (with translation).

* cited by examiner

TERMINAL STRUCTURE FOR WIRE HARNESS

TECHNICAL FIELD

The present invention relates to a terminal structure for in-vehicle wire harness.

BACKGROUND ART

In a terminal for a wire harness, which is fixed to a predetermined terminal fitting, a structure, which is resin-molded and is subjected to waterproof treatment, is a coated wire terminal connection part disclosed in Patent Document 1, for example.

The coated wire terminal connection part disclosed in Patent Document 1 is resin-molded by providing molding parts of a molding hollow set by storing the terminal connection part, in which a terminal fitting is pressure fixed to a tip conductor of a coated wire, in a mold made of upper and lower pieces, and injecting a molding resin in a molten state into the molding parts.

Thus, the coated wire terminal connection part disclosed in Patent Document 1 obtains fixed waterproof and anticorrosion effects by resin-molding the terminal for the wire harness.

PRIOR ART DOCUMENT

Patent Document

Patent Document 1: Japanese Patent No. 3627846

SUMMARY OF INVENTION

Problems to be Solved by the Invention

However, in the coated wire terminal connection part disclosed in Patent Document 1, since the terminal fitting is mounted on a flat surface such as an automobile body, the molding resin is just applied to a back surface of the terminal fitting to the extent that the resin does not impair flatness of the back surface of the terminal fitting.

Accordingly, since the back surface of the terminal fitting is not completely resin-molded, disadvantageously, a sufficient anticorrosion effect cannot be obtained.

The present invention has been made to solve the above-mentioned problem and an object thereof is to provide a terminal structure for in-vehicle wire harness having a high anticorrosion effect.

Means for Solving the Problems

A terminal structure for wire harness according to a first aspect of the present invention is a terminal structure for in-vehicle wire harness including a coated wire formed by coating a plurality of bare wire conductors with a coating part; a wire exposed part in which a part of the plurality of bare wire conductors is exposed at a terminal section; a terminal fitting fixed to the coated wire, the terminal fitting having a swaged part that is formed on one end and is fixed to the coated wire by being swaged along an outer circumference of the coating part of the coated wire in the vicinity of the wire exposed part; and a molding part formed so as to coat the entire outer circumference of at least an exposed end region of the swaged part and its adjacent region.

A second aspect according to the present invention is the terminal structure for wire harness according to the first aspect, wherein the terminal fitting has a plated region formed by plating the surface of the terminal fitting, and the exposed end region of the swaged part includes a non-plated region that is not subjected to plating.

A third aspect according to the present invention is the terminal structure for wire harness according to the second aspect, wherein a material for the plurality of bare wire conductors includes aluminum, a material for the terminal fitting includes copper, and a plating material for the plated region includes tin.

Effects of the Invention

In the first aspect of the present invention, since the molding part is formed so as to coat the entire outer circumference of the exposed end region of the swaged part and its adjacent region, it is possible to reliably avoid the possibility that the electrolytic solution enters from the exposed end region, and the material for the swaged part is corroded and finally, a part of the bare wire conductors is corroded.

As a result, the terminal structure for in-vehicle wire harness having a high anticorrosion effect can be advantageously obtained.

In the second aspect of the present invention, although the exposed end region of the swaged part includes the non-plated region that is not subjected to plating, the existence of the molding part can reliably avoid the possibility that the electrolytic solution enters from the exposed end region and finally a part of the bare wire conductors is corroded.

Thus, even when the exposed end region of the swaged part becomes the non-plated region that is not subjected to plating according to processing for forming the swaged part, it is no need to perform plating again and therefore, manufacturing costs of the terminal fitting having the swaged part can be reduced.

As in the third aspect of the present invention, even when a combination of the terminal fitting made of copper and the plurality of bare wire conductors made of aluminum, which is likely to cause a chain of corrosion, is used, the existence of the molding part can reliably avoid the possibility that the electrolytic solution enters from the exposed end region and finally a part of the bare wire conductors is corroded.

Thus, by using copper and aluminum more suitable for the terminal fitting and the bare wire conductors, respectively, the easy-to-use terminal structure for wire harness can be obtained.

These and other objects, features, aspects and advantages of the present invention will become more apparent from the following detailed description of the present invention when taken in conjunction with the accompanying drawings.

EMBODIMENT FOR CARRYING OUT THE INVENTION

Embodiment (Structure)

Figure 1:
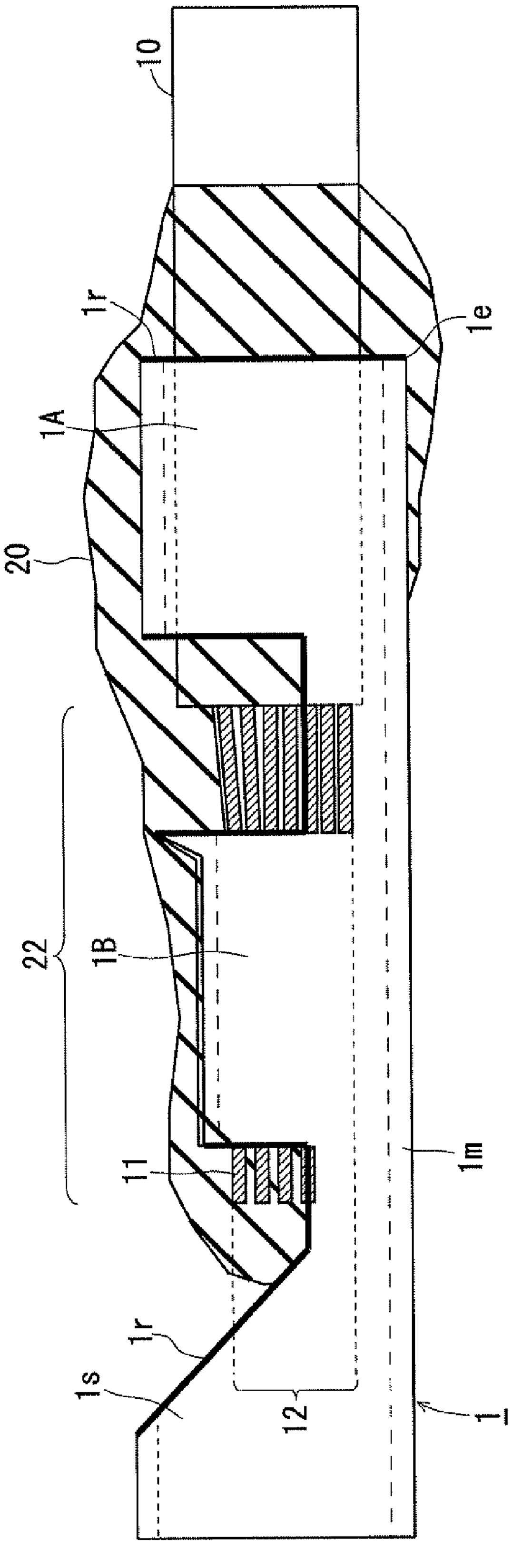
FIG. 1 is an explanatory view schematically showing a sectional structure of a terminal for in-vehicle wire harness in accordance an embodiment of the present invention.

FIG. 1 is an explanatory view schematically showing a sectional structure of a terminal for in-vehicle wire harness in accordance an embodiment of the present invention.

As shown in FIG. 1, a coated wire 10 formed by insulation-coating a plurality of bare wire conductors 11 with a coating part 13 (not shown in FIG. 1) has, at its terminal section, a wire exposed part 22 in which a part of a conductor group 12 made of the plurality of bare wire conductors 11 is exposed. Examples of materials for the bare wire conductors 11 include aluminum.

A terminal fitting 1 is fixed to the terminal section of the coated wire 10. That is, in a terminal region of the coated wire 10, a swaged part 1A formed at one end of the terminal fitting 1 is swaged along an outer circumference of a coating part of the coated wire 10, and a swaged part 1B (inner from the swaged part 1A) of the terminal fitting 1 is swaged along an outer circumference of the wire exposed part 22 of the conductor group 12, thereby fixing the terminal fitting 1 to the terminal section of the coated wire 10. Examples of materials for the terminal fitting 1 include brass and copper alloy.

A surface of the terminal fitting 1 is previously plated with tin to form a plated region 1*m*, and a fracture surface 1*r*, on which copper is exposed in processing the swaged part 1A and the swaged part 1B, exists. In FIG. 1, the surface of the fracture surface 1*r* is expressed by a thick line.

A molding resin 20 is formed so as to completely coat the entire outer circumference of at least the exposed end region (region including the fracture surface 1*r* and a base edge 1*e* at a right end in FIG. 1) of the swaged part 1A and its adjacent region. The molding resin 20 is further formed in the region above the terminal fitting 1 from the swaged part 1A to the wire exposed part 22 and the swaged part 1B.

Figure 2:
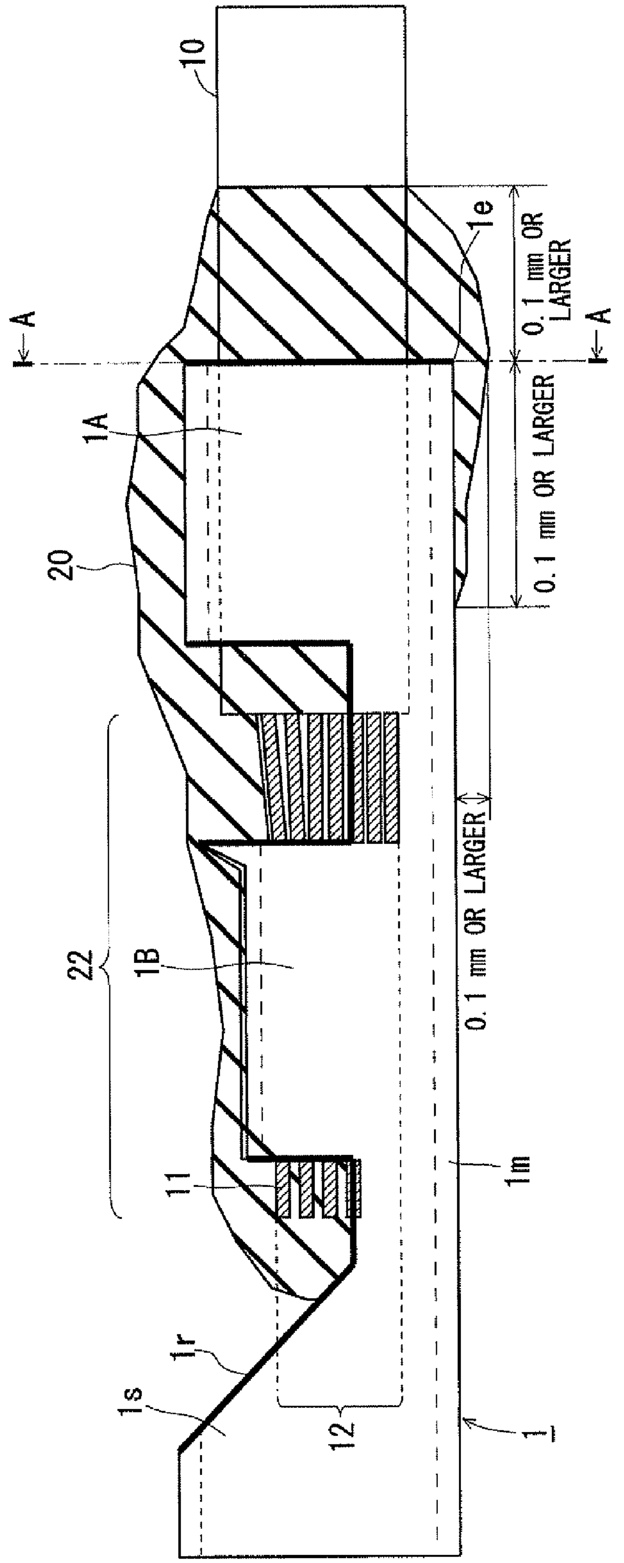
FIG. 2 is an explanatory view showing size dimensional property of the terminal structure for wire harness in this embodiment.

FIG. 2 is an explanatory view showing size dimensional property of the terminal structure for wire harness in this embodiment. As shown in FIG. 2, the molding resin 20 is formed to have a width of 1 mm or larger on the side of one end of the terminal fitting 1 (on the side of the coated wire 10) and have a width of 1 mm or larger on the side of the other end of the terminal fitting 1 (on the side of the swaged part 1B and the conductor group 12) using the base edge 1*e* in the exposed end region of the back surface of the swaged part 1A as a starting point. The thickness of the molding resin 20 at the base edge 1*e* is set to be 0.1 mm or larger.

Accordingly, the molding resin 20 has the dimensional property that can completely coat the base edge 1*e* and completely eliminate negative effect caused by corrosion of tin as the plate material for the plated region 1*m*.

Figure 3:
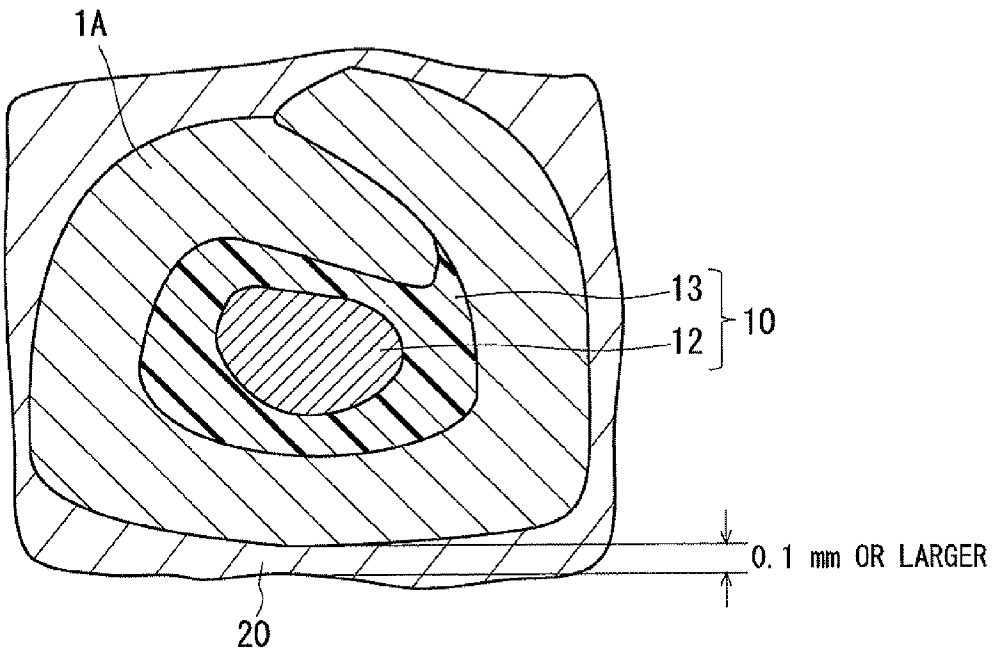
FIG. 3 is a sectional view showing a cross section taken along A-A in FIG. 2.

FIG. 3 is a sectional view showing a sectional structure of a cross section taken along A-A in FIG. 2. As shown in FIG. 3, in the cross section take along A-A in FIG. 2 (cross section of one end of the terminal fitting 1 (swaged part 1A)), the molding resin 20 is formed to completely coat the entire outer circumference of the swaged part 1A. That is, the molding resin 20 is formed to coat the entire outer circumference of the swaged part 1A with a thickness of 0.1 mm or larger. As shown in FIG. 3, the coated wire 10 is made of the conductor group 12 and the surrounding coating part 13.

(Comparison with Conventional Art)

Figure 4:
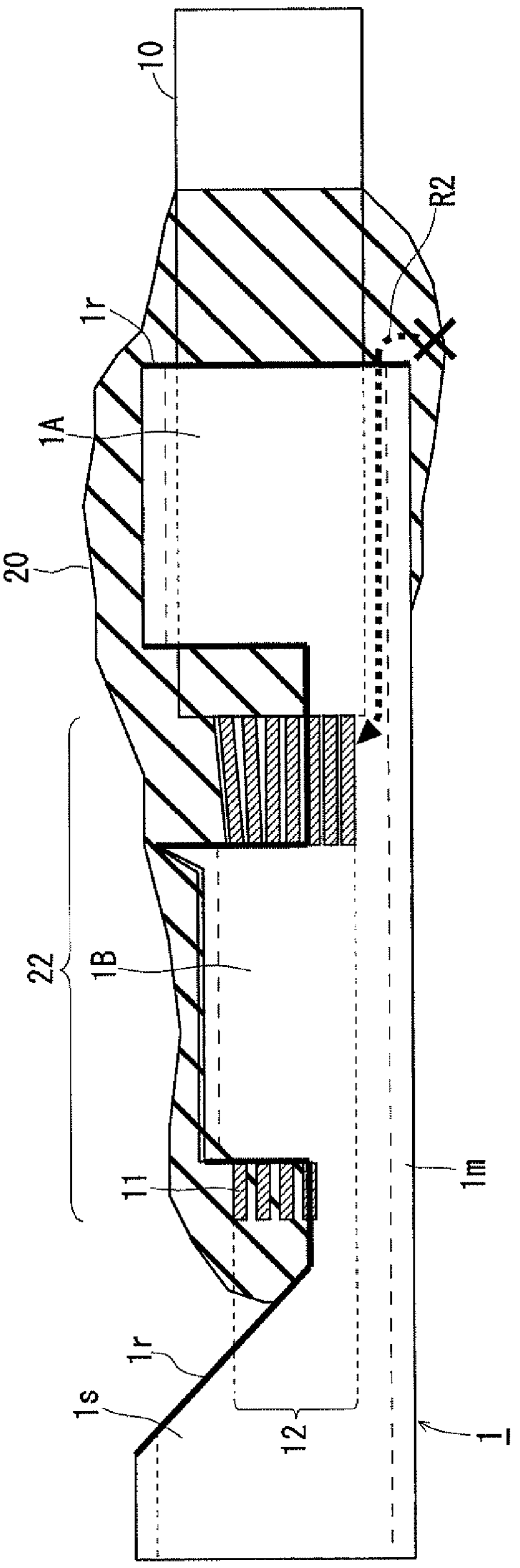
FIG. 4 is an explanatory view for describing effects of this embodiment.
Figure 6:
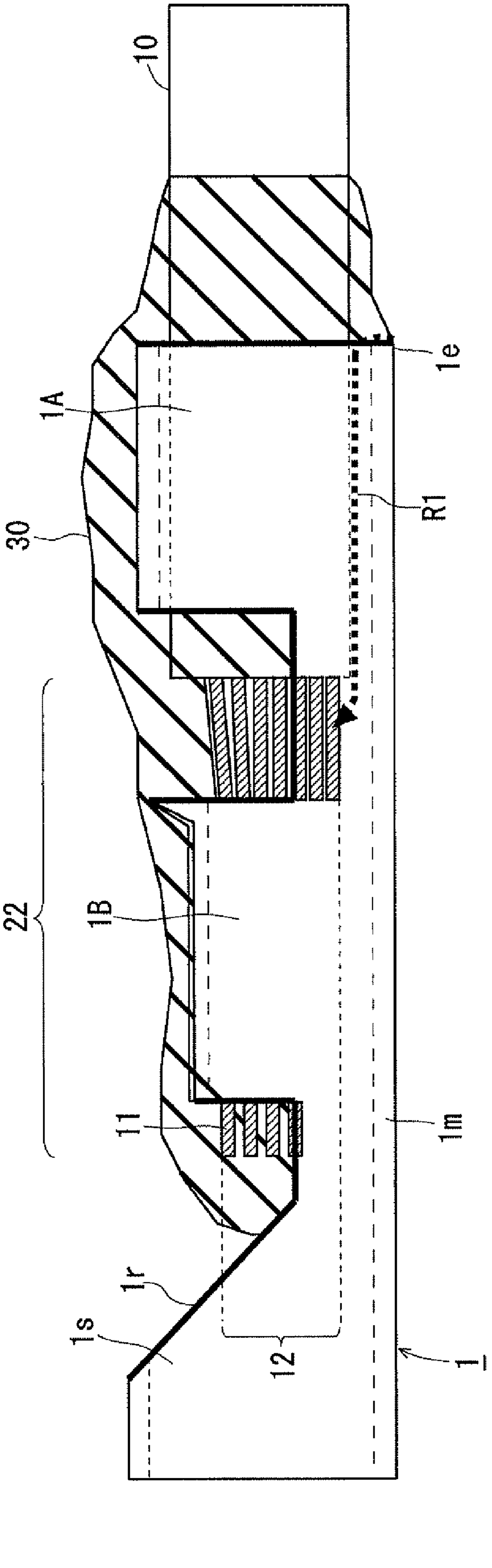
FIG. 6 is an explanatory view showing a conventional terminal structure for wire harness corresponding to the embodiment.

FIG. 4 and FIG. 6 are explanatory views for describing effects of this embodiment. FIG. 4 shows the structure of this embodiment, and FIG. 6 shows a conventional structure corresponding to the embodiment.

The structure shown in FIG. 4 is similar to that of the embodiment described with reference to FIG. 1 to FIG. 3 and thus, description thereof is omitted. On the contrary, in the conventional structure shown in FIG. 6, a formation region of a molding resin 30 extends to the base edge 1*e* of the swaged part 1A over the back surface of the coated wire 10. However, the molding resin 30 is not formed on the back surface of the swaged part 1A and thus, does not completely coat the region including the base edge 1*e*.

Consequently, the possibility that sea water and the like enters from the base edge 1*e* as electrolytic solution and the electrolytic solution permeates through an electrolytic solution mixing path R1 while corroding brass or copper alloy as a material for the terminal fitting 1 (swaged part 1A) and tin plating on the surface cannot be surely avoided. As a result, when the electrolytic solution reaches the conductor group 12 through the electrolytic solution mixing path R1, aluminum as a material for the bare wire conductors 11 tends to be ionized more easily than the brass or copper alloy as the material for the terminal and thus, is corroded.

As described above, since the molding resin 30 of the conventional terminal structure for wire harness typified by that in Patent Document 1 do not completely coat the base edge 1*e* of the swaged part 1A, the electrolytic solution mixing path R1 cannot be completely blocked, resulting in that the bare wire conductors 11 may be corroded.

On the contrary, in the terminal structure for wire harness in this embodiment, as shown in FIG. 4 (and FIG. 1 to FIG. 3), since the molding resin 20 is formed to completely coat the entire outer circumference of the exposed end region of the swaged part 1A including the base edge 1*e*, as shown in FIG. 4, a virtual electrolytic solution mixing path 2 from the fracture surface 1*r* at one end of the terminal fitting 1 can be completely blocked.

As described above, in the terminal structure for wire harness in this embodiment, since the molding resin 20 is formed to completely coat the entire outer circumference of the exposed end region that becomes the fracture surface 1*r* of the swaged part 1A and its adjacent region, the possibility that the electrolytic solution enters from the fracture surface 1*r* (base edge 1*e*) of the exposed end region, and brass or copper alloy in the swaged part 1A and tin plating on the surface are corroded and finally, a part of the bare wire conductors 11 is corroded can be reliably avoided. Additionally, the possibility that the electrolytic solution entering from the fracture surface 1*r* finally reaches the bare wire conductors 11 through a gap between the swaged part 1A and coated wire 10 and the bare wire conductors 11 are corroded can be avoided.

As a result, this embodiment has the effect of realizing the terminal structure for in-vehicle wire harness having a high anticorrosion effect. Therefore, electrical characteristics of the plurality of bare wire conductors 11 can be stably maintained.

Although the exposed end region of the swaged part 1A is the non-plated region (fracture surface 1*r*) other than the plated region 1*m*, as described above, the molding resin 20 can avoid the possibility that the electrolytic solution enters from the exposed end region and finally a part of the bare wire conductors is corroded.

Thus, even when the exposed end region of the swaged part 1A becomes the fracture surface 1*r* that is not subjected to plating according to processing for forming the swaged part 1A from the terminal fitting 1, it is no need to perform plating again and therefore, manufacturing costs of the terminal fitting 1 having the swaged part 1A can be reduced.

As in this embodiment, even when a combination of the terminal fitting 1 made of brass or copper alloy and the plurality of bare wire conductors 11 made of aluminum, which is likely to cause a chain of corrosion, is used, the molding resin 20 can avoid the possibility that the electrolytic solution enters from the exposed end region and finally a part of the bare wire conductors 11 is corroded.

Thus, by using copper and aluminum more suitable for the terminal fitting 1 and the bare wire conductors 11, respectively, the easy-to-use terminal structure for wire harness can be obtained.

(Another Mode)

Figure 5:
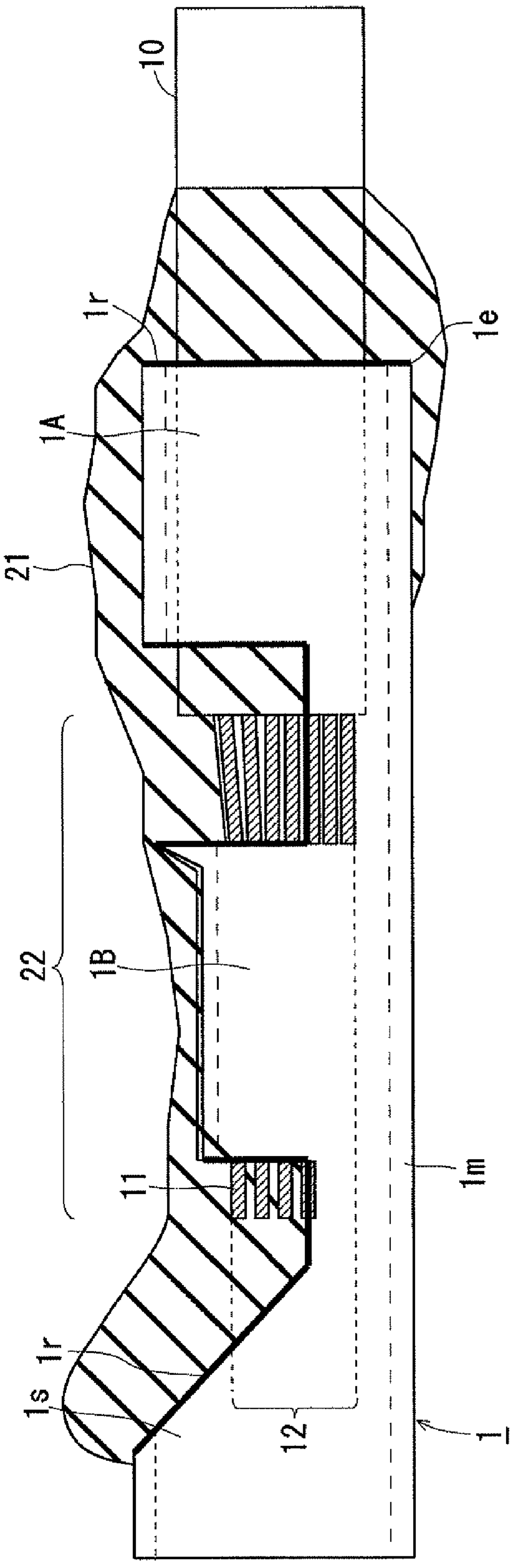
FIG. 5 is an explanatory view schematically showing another mode of this embodiment.

FIG. 5 is an explanatory view schematically showing another mode of this embodiment. As shown in FIG. 5, according to another mode, a molding resin 21 is formed to extend onto the fracture surface 1*r* at the other end 1*s* of the terminal fitting 1. It is to be noted that formation of the other region of the molding resin 21 is the same as that of the molding resin 30 shown in FIG. 1 to FIG. 4. This structure is the same as the structure in this embodiment shown in FIG. 1 to FIG. 4 except that the molding resin 30 is replaced with the molding resin 21.

As shown in FIG. 5, by forming the molding resin 21 also on the fracture surface 1*r* at the front end 1*s* of the terminal fitting 1, corrosion of the bare wire conductors 11 by entering of the electrolytic solution from the fracture surface 1*r* of the front end 1*s* can be also avoided.

As described above, the terminal structure for wire harness in accordance with another mode, by providing the molding resin 21 on all of the fracture surface 1*r* (non-plated region) of the terminal fitting 1, corrosion of the bare wire conductors 11 with corrosion of brass or copper alloy as the material for the terminal fitting 1 can be avoided more reliably.

While the invention has been shown and described in detail, the foregoing description is in all aspects illustrative and not restrictive. It is therefore understood that numerous modifications and variations can be devised without departing from the scope of the invention.

The invention claimed is:

1. A terminal structure for in-vehicle wire harness comprising:

a coated wire formed by coating a plurality of bare wire conductors with a coating part, said plurality of bare wire conductors having at a terminal section a wire exposed part in which a part of said plurality of bare wire conductors is exposed;

a terminal fitting fixed to said coated wire, the said terminal fitting having first and second swaged parts that are formed on one end, said first swaged part swaging along an outer circumference of said coating part of said coated wire in the vicinity of said wire exposed part, said second swaged part swaging along an outer circumference of said bare wire conductors said terminal fitting being fixed to said coated wire by said first and second swaged parts; and a molding part formed so as to coat the entire outer circumference of only exposed end region of said first swaged part and its adjacent region and coat an exposed end region of said second swaged part and its adjacent region wherein said terminal fitting has a plated region formed by plating a surface of said terminal fitting and each of said exposed end regions and said adjacent regions of said first and second swaged parts includes a non-plated region that is not subjected to plating.

2. The terminal structure for wire harness according to claim 1, wherein a material for said plurality of bare wire conductors includes aluminum, a material for said terminal fitting includes copper, and a plating material for said plated region includes tin.

3. The terminal structure for wire harness according to claim 1, wherein a portion of said molding part covering the entire outer circumference of the exposed end region of said first swaged part has a thickness of at least 0.1 millimeters.

* * * * *